United States Patent Office 3,773,859

Patented Nov. 20, 1973

1

3,773,859

AMIDOTHIONOPHOSPHORIC ACID PHENYL ESTERS

Gerhard Schrader, Wuppertal-Cronenberg, Ingeborg Hammann, Cologne, and Bernhard Homeyer, Opladen, Germany, assignors to Bayer Aktiengesellschaft, Leverkusen, Germany No Drawing. Filed Apr. 7, 1970, Ser. No. 26,444
Claims priority, application Germany, Apr. 14, 1969, P 19 18 753.2
Int. Cl. A01n 9/36; C07f 9/24
U.S. Cl. 260—941 9 Claims

ABSTRACT OF THE DISCLOSURE

Amidothionophosphoric acid phenyl esters, i.e. amidothionophosphoric acid O-alkyl-O-(2-carbalkoxy-phenyl-)-ester wherein the phenyl radical carries one or two halogen or lower alkyl substituents, or one alkylmercapto, alkylsulphoxyl or alkylsulphonyl substituent, which possess arthropodicidal, especially acaricidal and insecticidal, properties and to a process for their production.

The present invention relates to and has for its objects the provision of particular new amidothionophosphoric acid phenyl esters, i.e. amidothionophosphoric acid O-alkyl-O-(2-carbalkoxy-phenyl-)-ester wherein the phenyl radical carries one or two halogen or lower alkyl substituents, or one alkylmercapto, alkylsulphoxyl or alkylsulphonyl substituent, which possess arthropodicidal, especially insecticidal and acaricidal, properties, active compositions in the form of mixtures of such compounds with solid and liquid dispersible carrier vehicles, and methods for producing such compounds and for using such compounds in a new way especially for combating pests, e.g. arthropods, with other and further objects becoming apparent from a study of the within specification and accompanying examples.

It has now been found, in accordance with the present invention, that the particular new amidothionophosphoric acid phenyl esters of the general formula

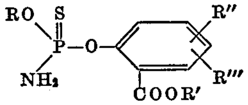

(I)

in which

R represents a straight or branched alkyl residue,

R′ represents a straight-chain, branched-chain or cyclic alkyl group with 1 to 6 carbon atoms, R″ represents a halogen atom, a lower alkyl, alkylmercapto, alkylsulphoxyl or alkylsulphonyl group, and R‴ represents a hydrogen or halogen atom or a lower alkyl residue, exhibit strong arthropodicidal, especially insecticidal and acaricidal, properties.

It has been furthermore found, in accordance with the present invention, that a process for the production of the compounds of Formula I above may now be provided which comprises reacting an O-alkyl-O-(2-carbalkoxy-phenyl-)-thionophosphoric acid diester monohalide of the formula

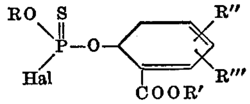

(II)

in which R, R′, R″ and R‴ have the significance given above, and Hal represents a halogen atom, with ammonia. Advantageously, the particular new compounds of Formula I above are distinguished by outstanding insecticidal and acaricidal properties as well as, in some cases, extremely low phytotoxicity. They possess a very good action both against biting and against sucking and soil-inhabiting insects and are in this respect distinctly superior to the above-mentioned products of analogous constitution. Therefore, the new compounds of the present invention represent a valuable enrichment of the art.

2

The course of the process may be represented by the following equation:

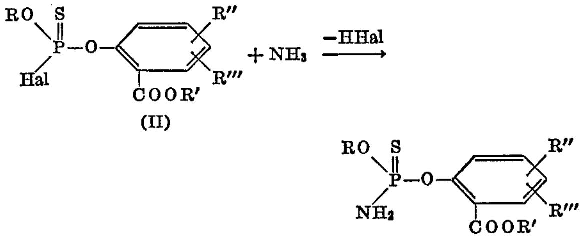

(II)

(I) (III)

Advantageously, in accordance with the present invention, in the various formulae herein:

R represents straight and branched chain lower alkyl hydrocarbon such as methyl, ethyl, n-, and iso-propyl, n-iso-, sec.- and tert.-butyl, and the like, especially $C_{1-4}$ alkyl;

R′ represents straight and branched chain lower alkyl hydrocarbons of at least 2 carbon atoms such as ethyl, n-, and iso-propyl, n-iso-, sec.- and tert.-butyl, n-, iso- and the branched amyls, n-, iso- and the branched hexyls, cyclohexyl, and the like, especially $C_{2-6}$ alkyl;

R″ represents a chlorine atom, or a lower alkyl or lower alkylmercapto group such as methyl, ethyl, n- and iso-propyl, methylmercapto, ethylmercapto or propylmercapto, and the like, especially $C_{1-3}$ alkyl or $C_{1-3}$ alkylmercapto;

R‴ represents hydrogen, chlorine or a lower alkyl group such as methyl, ethyl, n- and isopropyl, and the like, especially $C_{1-3}$ alkyl; and Hal represents chlorine or bromine.

The O-alkyl-O-(2-carbalkoxy-phenyl - ) - thionophosphoric acid diester monohalides of Formula II required as starting materials for the manufacture of the new compounds according to the invention have hitherto not been described in the literature; they are, however, easily obtainable, even on an industrial scale, by reaction of O-alkylthionophosphoric acid ester dihalides with the appropriate nuclear-substituted salicylic acid alkyl esters in the presence of solvents or diluents, and also using acid acceptors. Alkali hydroxides, carbonates and alcoholates, such as sodium and potassium hydroxides, methylates and ethylates, and tertiary bases such as triethylamine, diethylaniline, dimethylbenzylamine or pyridine, have proved especially suitable as acid acceptors. Furthermore, it is possible, instead of working in the presence of acid-binding agents, to manufacture the starting products by reaction of the appropriate salts, preferably alkali metal or ammonium salts of the particular nuclear-substituted salicylic acid esters.

It has proved appropriate to treat the mixture of salicylic acid alkyl ester and acid acceptor (or the appropriate salt of the salicylic acid ester) and solvent with the O-alkyl-thionophosphoric acid ester dihalide, but the converse addition can also be chosen.

The reaction of the O-alkyl-O-(2-carbalkoxy-phenyl)-thionophosphoric acid diester monohalide (II) with ammonia also preferably takes place in the presence of solvents or diluents, particularly those which are substantially inert to the reagents. As such, it is, in particular, possible to use water, low-boiling aliphatic alcohols such as methanol, ethanol, propanol or butanol, ketones, for example acetone, methylethyl ketone, methyl isopropyl ketone or methyl isobutyl ketone, nitriles, for example acetonitrile and propionitrile, optionally chlorinated aliphatic or aromatic hydrocarbons such as methylene chloride and ethylene chloride, chloroform, carbon tetrachloride, monochloroethylene, dichloroethylene and trichloroethylene, benzene, toluene, xylene and chlorobenzene, and ethers, for example, diethyl ether and di-n-butyl ether or dioxane.

Furthermore, in the process for the production of the end products using an acid-binding agent, an excess of ammonia may conveniently serve as the acid acceptor. Either gaseous or aqueous ammonia can be used.

The process can be carried out within a wide temperature range. In general, it is carried out at room temperature or at a slightly to moderately elevated temperature, and preferably at 20° to 60° C. Finally, it has proved appropriate to stir the reaction mixture for a long period (say, between 1 and 12 hours) after combining the starting materials, optionally with slight warming, in order to complete the reaction.

According to the Equation III given above, equimolar amounts of the starting materials are theoretically necessary. The mixture is worked up in the usual manner, by taking it up, where the process has been carried out in an aqueous medium, in a solvent which is immiscible with water, preferably a hydrocarbon or ether, washing the resulting solution, and, after separation of the layers and drying of the organic phase, evaporating the solvent and subjecting the residue, where possible, to fractional distillation.

The amidothionophosphoric acid phenyl esters according to the present invention are mostly colorless to slightly colored, water-insoluble oils which usually cannot be distilled without decomposition even under greatly reduced pressure. Where this is the case the products can, however, be freed of the last volatile constituents by so-called "slight distillation," that is to say brief heating to a slightly to moderately elevated temperature, and can be purified in this way. As already mentioned above, the amidothionophosphoric acid phenyl esters according to the invention, while in part having an extremly low phytotoxicity, possess an outstanding, rapidly starting and long-lasting insecticidal and acaricidal action. The products are therefore successfully employed in plant protection for combating harmful sucking and biting insects, Diptera and mites (Acarina).

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum pisi*) and the potato aphid (*Macrosiphum solanifolii*), the current gall aphid (*Cryptomyzus korschelti*), the mealy apple aphid (*Sappahsis mali*) the mealy plum aphid (*Hyaltopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (Thysanoptera), such as *Hercinothrips femoralis*, and bugs, for example the beet bug (*Piesma quadrata*), the cotton bug (*Dysdercus intermedius*), the bed bug (*Cimex lectularius*), the assassin bug (*Rhodnius prolixus*) and Chagas' bug (*Triatoma infestans*) and, further, cicadas, such as *Euscelis bilobatus* and *Nephotettix bipunctatus*, and the like.

With the biting insects contemplated herein there are classes, in the main, butterfly caterpillars (Lepidoptera) such as the diamond-back moth (*Plutella maculipennis*), the gypsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), the ermine moth (*Hyponomeuta padella*), the Mediterranean flour moth (*Ephestia künniela*) and greater wax month (*Galleria mellonella*), and the like.

Also to be classed with the biting insects are beetles (Coleoptera), for example the granary weevil (*Sitophilus granarius, Calandra granaria*), the Colorado beetle (*Leptinotarsa decemlineata*), the dock bettle (*Gastrophysa viridula*), the mustard beetle (*Phaedon cochleariae*), the blossom bettle (*Meligethes aeneus*), the raspberry beetle (*Byturus tomentosus*), the bean weevil (*Bruchidius*=*Acanthoscelides obstectus*), the leather beetle (*Dermestes frischi*), the khapra bettle (*Trogoderma granarium*), the flour bettle (*Tribolium castaneum*), the northern corn billbug (*Calandra* or *Sitophilus zeamais*), the drugstore bettle (*Stegobium paniceum*), the yellow mealworm (*Tenebrio molitor*) and the saw-toothed grain beetle (*Oryzaephilus surinamensis*), and also species living in the soil, for example wireworms (Agriotes spec.) and larvae of the cockchafer (*Melolontha melolontha*); cockroaches, such as the Germany crockroach (*Blattella germanica*), American cockroach (*Periplaneta americana*), Madeira cockroach (*Leucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexivitta*; further Orthoptera, for example the house cricket (*Acheta domesticus*); termites such as the eastern subterranean termite (*Reticulitermes flavipes*) and Hymenoptera such as ants, for example the garden ant (*Lasius niger*); and the like.

The Diptera comprise essentially the flies, such as the vinegar fly (*Drosophila melanogaster*), the Mediterranean fruit fly (*Ceratitis capitata*), the house fly (*Musca domestica*) the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*); and the like.

With the mites (Acari) there are classed, in particular, the spider mites (Tetranychidae) such as the two-spotted spider mite (*Tetranychus telarius*=*Tetranychus althaeae* or *Tetranychus urticae*) and the European red mite (*Paratetranychus pilosus*=*Panonychus ulmi*), blister mites, for example the currant blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*); and the like.

The active compounds according to the instant invention can be utilized, if desired, in the form of the usual formulations or compositions with conventional inert (i.e. plant compatible or herbicidally inert) pesticidal diluents or extenders, i.e. diluents or extenders of the type usable in conventional pesticidal formulations or compositions, e.g. conventional pesticidal dispersible carrier vehicles such as solutions, emulsions, suspensions, emulsifiable concentrates, spray powders, pastes, soluble powders, dusting agents, granules, etc. These are prepared in known manner, for instance by extending the active compounds with conventional pesticidal dispersible liquid diluent carriers and/or dispersible solid carriers optionally with the use of carrier vehicle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated, especially chlorinated, aromatic hydrocarbons (e.g. chlorobenzenes, etc.), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.) ethers, etheralcohols (e.g. glycol monomethyl ether, etc.), amides (e.g. dimethyl formamide, etc.), sulfoxides (e.g. dimethyl sulfoxide, etc.), ketones (e.g. acetone, etc.) and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Such active compounds may be employed alone or in the form of mixtures with one another and/or with such solid and/or liquid dispersible carrier vehicles and/or with other known compatible active agents, especially plant protection agents, such as other acaricides and insecticides, or fungicides, herbicides, bactericides, etc., if desired, or in the form of particular dosage preparations for specific application made therefrom, such as solutions, emulsions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.001–5%, preferably 0.002–1%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.00001 to 95%, preferably 0.00001 to 20% and most preferably 0.0. to 5% by weight of the mixture.

The active compounds can also be used in accordance with the well known ultra-low-volume process with good success, i.e. by applying such compound if normally a liquid, or by applying a liquid composition containing the same, via very effective atomizing equipment in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95% by weight of active compound or even the 100% active substance alone, e.g. about 20–100% by weight of the active compound.

In particular, the present invention comtemplates methods of selectively killing, combating or controlling pests, e.g. arthropods, i.e. insects and acarids, and more particularly, methods of combating at least one of insects and acarids which comprise applying to at least one of correspondingly (a) such insects, (b) such acarids, and (c) the corresponding habitat, i.e. the locus to be protected, a correspondingly combative or toxic amount, i.e. an arthropodicidally, especially insecticidally or acaricidally, effective amount of the particular active compound of the invention alone or together with a carrier vehicle as noted above. The instant formulations or compositions are applied in the usual manner, for instance by spraying, atomizing, vaporizing, scattering, dusting, watering, sprinkling, pouring, fumigating, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outsanding activity of the particular new compounds of the present invention is illustrated without limitation by the following examples.

EXAMPLE 1

Phaedon larvae test

Solvent: 3 parts by weight of acetone
Emulsifier: 1 part by weight of alkylaryl polyglycol ether.

To produce a suitable preparation of active compound, 1 part by weight of the active compound is mixed with the stated amount of solvent containing the stated amount of emulsifier, and the concentrate is diluted with water to the desired final concentration.

Cabbage leaves (*Brassica oleracea*) are sprayed with the preparation of the active compound until dripping wet and then infested with mustard bettle larvae (*Phaedon cochleariae*).

After the specified periods of time, the degree of destruction is determined as a percentage: 100% means that all the bettle larvae are killed. 0% means that none of the bettle larvae are killed.

The active compounds, the concentration of the active compounds, the times of evaluation and the results can be seen from the following Table 1:

TABLE 1

(Phaedon larvae test)

| Active compound (constitution) | | Active compound concentration in percent | Degree of destruction in percent after 3 days |
|---|---|---|---|
| 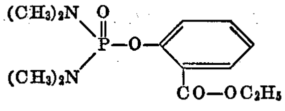 (known) | (A) | 0.1 | 0 |
| 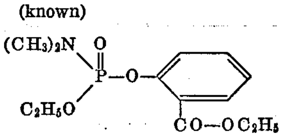 (known) | (B) | 0.1 | 100 |
| | | 0.01 | 0 |
| 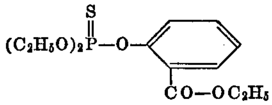 (known) | (C) | 0.1 | 0 |
| 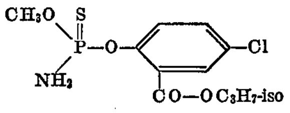 | (1) | 0.1 | 100 |
| | | 0.01 | 100 |
| | | 0.001 | 100 |
| 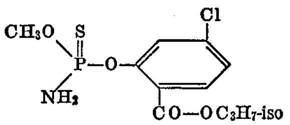 | (2) | 0.1 | 100 |
| | | 0.01 | 100 |
| | | 0.001 | 80 |

TABLE 1—Continued

| Active compound (constitution) | | Active compound concentration in percent | Degree of destruction in percent after 3 days |
|---|---|---|---|
| 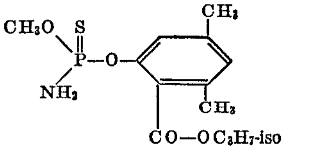 | (3) | 0.1<br>0.01 | 100<br>65 |
| 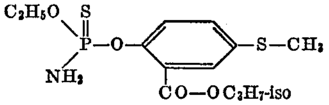 | (4) | 0.1<br>0.01 | 100<br>100 |
| 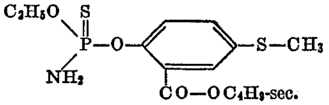 | (5) | 0.1<br>0.01 | 100<br>100 |
| 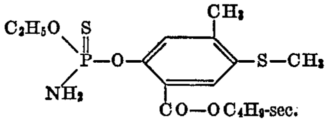 | (6) | 0.1<br>0.01 | 100<br>100 |

EXAMPLE 2

Plutella test

Solvent: 3 parts by weight of acetone
Emulsifier: 1 part by weight of alkylaryl polyglycol ether.

To produce a suitable preparation of active compound, 1 part by weight of the active compound is mixed with the stated amount of solvent containing the stated amount of emulsifier and the concentrate is diluted with water to the desired final concentration.

Cabbage leaves (*Brassica oleracea*) are sprayed with the preparation of the active compound until dew moist and are then infested with caterpillars of the diamond-back moth (*Plutella maculipennis*).

After the specified periods of time, the degree of destruction is determined as a percentage: 100% means that all the caterpillars are killed whereas 0% means that none of the caterpillars are killed.

The active compounds, the concentration of the active compounds, the evaluation times and the results can be seen from the following Table 2:

TABLE 2

(Plutella test)

| Active compound (constitution) | | Active compound concentration in percent | Degree of destruction in percent after 3 days |
|---|---|---|---|
| 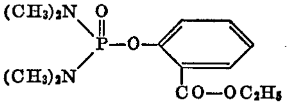<br>(known) | (A) | 0.1 | 0 |
| 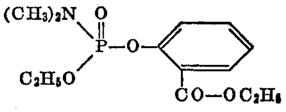<br>(known) | (B) | 0.1<br>0.01 | 30<br>0 |
| 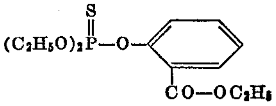<br>(known) | (C) | 0.1<br>0.01 | 80<br>0 |

TABLE 2—Continued

| Active compound (constitution) | | Active compound concentration in percent | Degree of destruction in percent after 3 days |
|---|---|---|---|
| 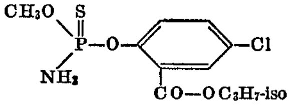 | (1) | 0.1<br>0.00 | 100<br>100 |
| 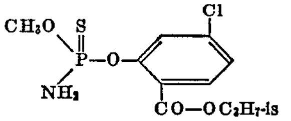 | (2) | 0.1<br>0.01<br>0.001 | 100<br>100<br>100 |
| 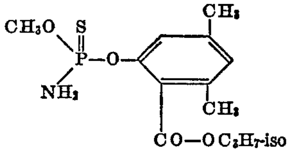 | (3) | 0.1<br>0.01 | 100<br>75 |
| 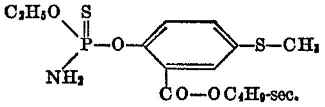 | (5) | 0.1<br>0.01 | 100<br>75 |
| 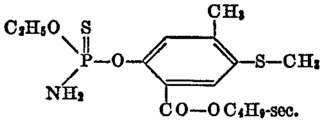 | (6) | 0.1<br>0.01 | 100<br>75 |

EXAMPLE 3

Myzus test (contact action)

Solvent: 3 parts by weight of acetone
Emulsifier: 1 part by weight of alkylaryl polyglycol ether.

To produce a suitable preparation of active compound, 1 part by weight of the active compound is mixed with the stated amount of solvent containing the stated amount of emulsifier and the concentrate is diluted with water to the desired final concentration.

Cabbage plants (*Brassica oleracea*) which have been heavily infested with peach aphids (*Myzus persicae*) are sprayed with the preparation of the active compound until dripping wet.

After the specified periods of time, the degree of destruction is determined as a percentage: 100% means that all the aphids are killed whereas 0% means that none of the aphids are killed.

The active compounds, the concentrations of the active compounds, the evaluation times and the results can be seen from the following Table 3:

TABLE 3

(Myzus test)

| Active compound (constitution) | | Active compound concentration in percent | Degree of destruction in percent after 24 hours |
|---|---|---|---|
| 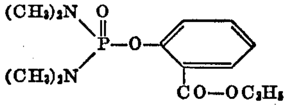<br>(known) | (A) | 0.1 | 0 |
| 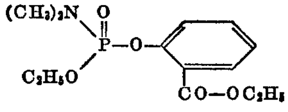<br>(known) | (B) | 0.1 | 0 |

TABLE 3—Continued

| Active compound (constitution) | | Active compound concentration in percent | Degree of destruction in percent after 24 hours |
|---|---|---|---|
| 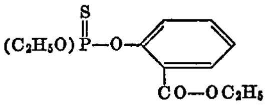 (known) | (C) | 0.1 | 0 |
| 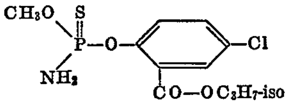 | (1) | 0.1<br>0.01 | 100<br>99 |
| 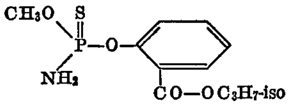 | (2) | 0.1<br>0.01<br>0.001 | 100<br>100<br>40 |
| 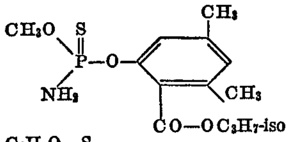 | (3) | 0.1<br>0.01 | 99<br>40 |
| 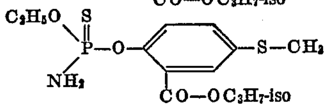 | (4) | 0.1<br>0.01 | 100<br>100 |
| 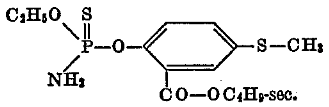 | (5) | 0.1<br>0.01 | 100<br>99 |
| 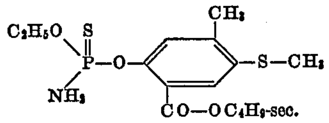 | (6) | 0.1 | 100 |

EXAMPLE 4

Tetranychus test

Solvent: 3 parts by weight of acetone
Emulsifier: 1 part by weight of alkylaryl polyglycol ether.

To produce a suitable preparation of active compound, 1 part by weight of the active compound is mixed with the stated amount of solvent containing the stated amount of emulsifier and the concentrate so obtained is diluted with water to the desired final concentration.

Bean plants (*Phaseolus vulgaris*), which have a height of approximately 10–30 cm., are sprayed with the preparation of the active compound until dripping wet. These bean plants are heavily infested with spider mites (*Tetranychus urticae*) in all stages of development.

After the specified periods of time, the effectiveness of the preparation of active compound is determined by counting the dead mites. The degree of destruction thus obtained is expressed as a percentage: 100% means that all the spider mites are killed whereas 0% means that none of the spider mites are killed.

The active compounds, the concentrations of the active compounds, the evaluation times and the results can be seen from the following Table 4:

TABLE 4
(Tetranychus test)

| Active compound (constitution) | | Active compound concentration in percent | Degree of destruction in percent after 48 hours |
|---|---|---|---|
| 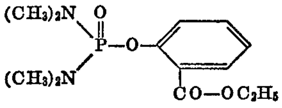 (known) | (A) | 0.1 | 0 |
| 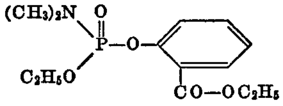 (known) | (B) | 0.1 | 0 |
| 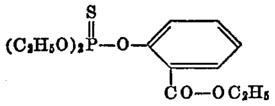 (known) | (C) | 0.1 | 0 |
| 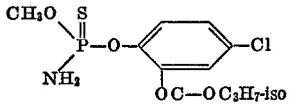 | (1) | 0.1<br>0.01 | 100<br>99 |
| 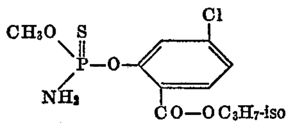 | (2) | 0.1 | 65 |

EXAMPLE 5

Critical concentration test/soil insects

Test insect: Cabbable fly maggots (*Phorbia brassicae*)
Solvent: 3 parts by weight of acetone
Emulsifier: 1 part by weight of alkylaryl polyglycol ether.

To produce a suitable preparation of active compound, 1 part by weight of active compound is mixed with the stated amount of solvent, the stated amount of emulsifier is added and the concentrate is diluted with water to the desired final concentration. The preparation of active compound is intimately mixed with the soil. The concentration of the active compound in the preparation is of practically no importance; only the amount by weight of active compound per unit volume of soil, which is given in p.p.m. (e.g. mg./1.), is decisive. The soil is filled into pots and the pots are left to stand at room temperature. After 24 hours the test insects are put into the treated soil and after a further 48 hours the degree of effectiveness of the active compound is determined as a percentage by counting the dead and live test insects. The degree of effectiveness is 100% when all the test insects have been killed; it is 0% when exactly as many test insects are still alive as in the case of the control.

The active compounds, the amounts applied and the results can be seen from the following Table 5:

TABLE 5

(Phorbia test)

| Active compound (constitution) | | Active compound concentration in p.p.m. | Degree of destruction in percent |
|---|---|---|---|
| 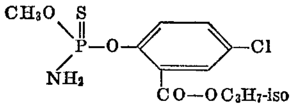 | (1) | 20<br>10<br>5 | 100<br>100<br>50 |
| 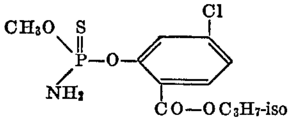 | (2) | 20<br>10<br>5 | 100<br>100<br>50 |

The following further examples are set forth to illustrate, without limitation, the process for producing the active compounds according to the present invention.

EXAMPLE 6

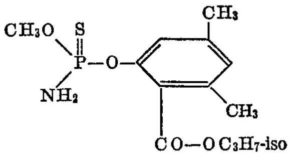

(3)

0.35 molar batch:

119 g. of O-methyl-O-(2-carbisopropoxy-3,5-dimethylphenyl-)-thionophosphoric acid diester monochloride are dissolved in 600 cc. of benzene. Dry ammonia is passed into this solution at 20° C. (slight external cooling), while stirring, until the reaction is complete, and the mixture is stirred for a further hour after the introduction. The reaction mixture is then twice washed with 30 cc. of water each time, the benzene layer is separated off and dried over sodium sulphate, and the solvent is subsequently evaporated under reduced pressure. The residue is briefly heated at a pressure of 0.3 mm. Hg to a bath temperature of 100° C.

75 g.(68% of theory) of the amidothionophosphoric acid O-methyl-O-(2-carbisopropoxy-3,5-dimethylphenyl-)-ester of refractive index $n_D^{24}=1.5302$ are thus obtained.

Calculated for a molecular weight of 317 (percent): P, 9.8; S, 10.1; N, 4.4. Found (percent): P, 9.6; S, 9.9; N, 4.1.

The O-methyl-O-(2 - carbisopropoxy-3,5-dimethylphenyl-)-thionophosphoric acid diester monochloride required as the starting material can be obtained as follows:

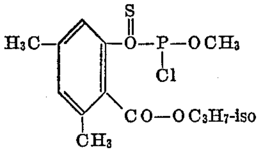

(IIa 0.5 molar batch:

30 g. of potassium hydroxide are dissolved in 300 cc. of isopropanol and 104 g. of 4,6-dimethyl-salicylic acid isopropyl ester (boiling point: 100° C.; $n_D^{24}=1.5141$) are added to the solution. After adding 500 cc. of benzene, the water formed is distilled off azeotropically under reduced pressure and the potassium salt which remains is dissolved in 300 cc. of acetonitrile. 83 g. of O-methylthionophosphoric acid ester dichloride are now added to the reaction mixture while stirring, the mixture is stirred for a further 12 hours at 30° C., and the batch is then diluted with 400 cc. of benzene. The benzene solution is twice washed with 50 cc. of ice water and subsequently separated off and dried over sodium sulphate. After distilling off the benzene, 119 g. (71% of theory) of the O-methyl-O-(2-carboisopropoxy - 3,5 - dimethylphenyl)-thionophosphoric acid diester monochloride are obtained as a pale yellow, water-insoluble oil having a refractive index $n_D^{22}=1.5245$.

EXAMPLE 7

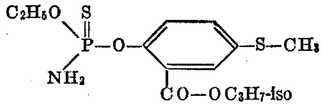

(4)

0.35 molar batch:

133 g. of O-ethyl-(2-carbisopropoxy-4-methylmercaptophenyl-)-thionophosphoric acid diester monochloride of the following formula:

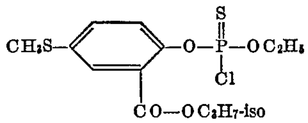

(IIb)

(manufactured according to the process of Example 6 by reaction of the corresponding potassium salt of 5-methylmercapto-salicylic acid isopropyl ester with O-ethylthionophosphoric acid ester dichloride) are stirred for 1 hour at 25 to 30° C. with 100 cc. of 25% strength aqueous ammonia. Thereafter a further 25 cc. of ammonia-water are added to the reaction mixture and this is stirred for a further 10 hours. The batch is then taken up in 300 cc. of ether and the ether solution is washed with water, separated off and dried over sodium sulphate.

After distilling off the solvent, 85 g. (70% of theory) of amidothionophosphoric acid O-ethyl-O-(2-carbisopropoxy-4-methylmercaptophenyl-)-ester are obtained in the form of a yellow, water-soluble oil of refractive index $n_D^{23}=1.5678$.

Calculated for a molecular weight of 349 (percent): P, 8.9; S, 18.3; N, 4.0. Found (percent): P, 8.6; S, 18.0; N, 3.9.

EXAMPLE 8

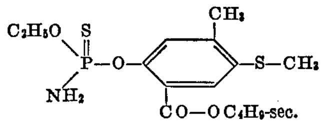

(5)

0.39 molar batch:

149 g. of O-ethyl-O-(2-carb-sec.-butoxy-4-methylmercaptophenyl-)-thionophosphoric acid diester monochloride of the following formula:

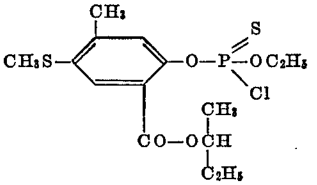

(IIc)

are stirred with 100 cc. of 25% strength aqueous ammonia. After one hour a further 20 cc. of ammonia-water are added to the reaction mixture which is stirred for a further 10 hours at room temperature. After working up the mixture as described in Example 2, 112 g. (79% of theory) of amidothionophosphoric acid O-ethyl-O-(2-carb-sec.-butoxy-4-methylmercaptophenyl-)-ester are obtained as a yellow water-insoluble oil of refractive index $$n_D^{22}=1.5626$$

Calculated for a molecular weight of 363 (percent): P, 8.5; S, 17.6; N, 3.8. Found (percent): P, 8.3; S, 17.4; N, 3.7.

EXAMPLE 9

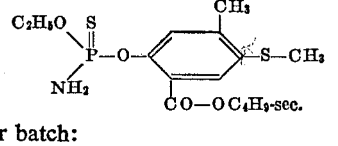

(6)

0.24 molar batch:

95 g. of O-ethyl-O-(2 - carb.-sec.-butoxy-4-methylmercapto-5 - methyl-phenyl-)-thionophosphoric acid diester monochloride of the following formula:

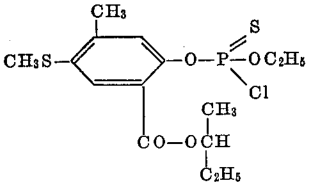

(IId)

are stirred with 50 cc. of 25% strength aqueous ammonia, after one hour a further 10 cc. of aqueous ammonia are added to the reaction mixture, and the mixture is then stirred for a further 10 hours at room temperature. After working up the mixture as in Example 7, 77 g. (85% of theory) of amidothionophosphoric acid O-ethyl-O-(2-carb-sec.-butoxy-4-methylmercapto - 5 - methyl-phenyl-)-ester are obtained as a slightly yellow, water-insoluble oil of refractive index $n_D^{22}=1.5602$.

Calculated for a molecular weight of 377 (percent): P, 8.2; S, 17.0; N, 3.7. Found (percent): P, 8.6; S, 16.8; N, 3.4.

EXAMPLE 10

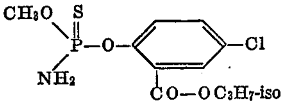

(1)

0.45 molar batch:

155 g. of O-methyl-O-(2 - carbisopropoxy - 4 - chlorophenyl-)-thionophosphoric acid diester monochloride of the following formula:

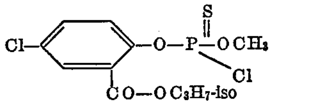

(IId)

are added at 30 to 45° C., while stirring, to 100 cc. of 20% strength aqueous ammonia, and the mixture is kept at 40° C. for a further hour and then worked up in the manner described in Example 7. 110 g. (72% of theory) of amidothionophosphoric acid O-methyl-O - (2 - carbisopropoxy-4-chlorophenyl-)-ester are obtained in the form of a slightly yellow, water-insoluble oil of refractive index $n_D^{22}=1.5461$.

Calculated for a molecular weight of 323.5 (percent): P, 9.6; S, 9.9; N, 4.3; Cl, 11.0. Found (percent): P, 9.4; S, 9.7; N, 4.7; Cl, 11.4.

EXAMPLE 11

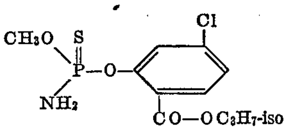

(2)

0.22 molar batch:

77 g. of O-methyl-O-(2 - carbisopropoxy - 5 - chlorophenyl-)-thionophosphoric acid diester monochloride of the following formula:

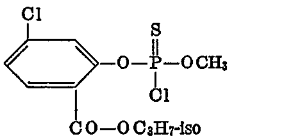

(IId)

are added at 25° to 30° C. to 60 cc. of 20% strength aqueous ammonia, while stirring. The mixture is stirred for a further hour at 35 to 40° C. and is then worked up as described in Example 7. 53 g. (74% of theory) of the amidothionophosphoric acid O-methyl-O-(2 - carbisopropoxy-5-chlorophenyl-)-ester are obtained as a yellow, water-insoluble oil of refractive index $n_D^{22}=1.5389$.

Calculated for a molecular weight of 323.5 (percent): P, 9.6; S, 9.9; N, 4.3; Cl, 11.0. Found (percent): P, 9.8; S, 9.6; N, 4.1; Cl, 10.7.

As may be used herein, the terms "arthropod," "arthropodical" and "arthropodicide" comtemplate specifically both insects and acarids. Thus, the insects and acarids may be considered herein collectively as arthropods to be combated in accordance with the invention, and accordingly the insecticidal and/or acaricidal activity may be termed arthropodicidal activity, and the concomitant combative or effective amount used will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What we claim is:

1. Amidothionophosphoric acid phenyl esters of the formula

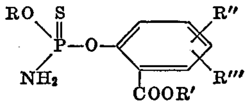

(I)

wherein

R represents a lower alkyl group of 1 to 4 carbon atoms,

R' represents a straight-chain, branched-chain or cyclic alkyl group with 1 to 6 carbon atoms, R'' represents a chlorine atom or an alkyl or alkylmercapto group with 1 to 5 carbon atoms, and R''' represents a hydrogen or halogen atom or a lower alkyl residue, the radicals R'' and R''' being in the 3, 4 or 5-positions.

2. Compound according to claim 1 in which R' represents an alkyl group with 2 to 6 carbon atoms, and R''' represents hydrogen, chlorine, or an alkyl group having 1 to 3 carbon atoms.

3. Compound according to claim 2 in which R represents a lower alkyl group with 1 or 2 carbon atoms and R' represents a lower alkyl group with 2 to 4 carbon atoms.

4. Compound according to claim 1 wherein such compound is amidothionophosphoric acid O-methyl-O-(2-carbisopropoxy-4-chlorophenyl-)-ester of the formula:

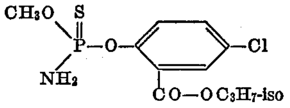

(1)

5. Compound according to claim 1 wherein such compound is amidothionophosphoric acid O-methyl-O-(2-carbisopropoxy-5-chlorophenyl-)-ester of the formula:

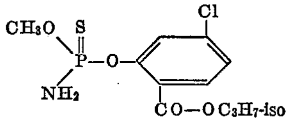

(2)

6. Compound according to claim 1 wherein such compound is amidothionophosphoric acid O-methyl-O-(2-carbisopropoxy - 3,5 - dimethylphenyl-)-ester of the formula:

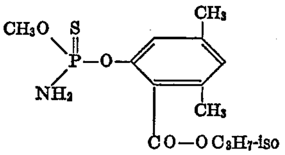

(3)

7. Compound according to claim 1 wherein such compound is amidothionophosphoric acid O-ethyl-O-(2-carbisopropoxy-4-methylmercapto phenyl-)-ester of the formula:

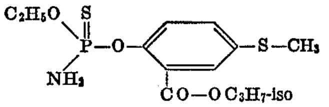

(4)

8. Compound according to claim 1 wherein such compound is amidothionophosphoric acid O-ethyl-O-(2-carbsec.-butoxy-4-methylmercaptophenyl-)-ester of the formula:

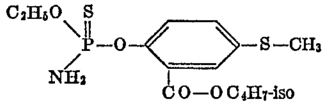

(5)

9. Compound according to claim 1 wherein such compound is amidothionophosphoric acid O-ethyl-O-(2-carbsec.-butoxy-4-methylmercapto-5-methylphenyl-)-ester of the formula:

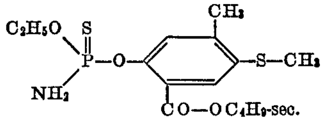

(6)

References Cited

UNITED STATES PATENTS 3,621,082 11/1971 Schrader et al. ...... 260—941

FOREIGN PATENTS 6,744 4/1966 Japan .............. 260—941

ANTON H. SUTTO, Primary Examiner

U.S. Cl. X.R.

260—984; 424—212

FO-1050
(5/69)

UNITED STATES PATENT OFFICE
CERTIFICATE OF CORRECTION

Patent No. 3,773,859 Dated November 20, 1973

Inventor(s) Gerhard Scbrader et al Page 1 of 2

It is certified that error appears in the above-identified patent and that said Letters Patent are hereby corrected as shown below:

Col. 1, line 65, compound (II), correct formula to read as follows:

-- 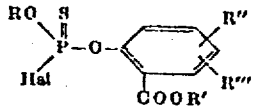 --.

Col. 3, lines 54 and 55, correct spelling of "sappaphis".

Col. 3, line 55, correct spelling of "Hyalopterus".

Col. 4, line 4, change "month" to -- moth --.

Col. 9, Table 3, compound (2), correct formula to read as follows:

-- 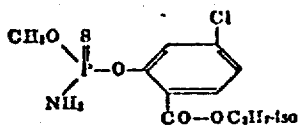 --.

Col. 12, Example 8, Compound (IIc), correct formula to read as follows:

-- 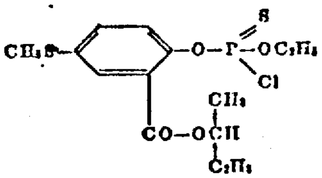 --.

FO-1050
(5/69)

UNITED STATES PATENT OFFICE
CERTIFICATE OF CORRECTION

Patent No. 3,773,859 Dated

Inventor(s) Page 2 of 2

It is certified that error appears in the above-identified patent and that said Letters Patent are hereby corrected as shown below:

Col. 13, Example 10, compound (IId), correct formula to read as follows:

-- 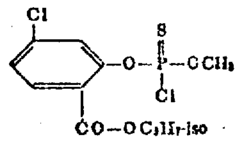 --.

Col. 13, line 68, Example 11, after the formula, insert -- (IIe) --.

Col. 14, line 32, claim 1, cancel "5" and insert therefor -- 3 --.

Col. 15, line 17, claim 8, in the formula, cancel "iso" and substitute therefor -- sec --.

Signed and sealed this 22nd day of October 1974.

(SEAL)
Attest:

McCOY M. GIBSON JR.
Attesting Officer

C. MARSHALL DANN
Commissioner of Patents